United States Patent
Li

(10) Patent No.: US 11,156,510 B2
(45) Date of Patent: Oct. 26, 2021

(54) KEY UNIT AND KEY ARRAY

(71) Applicant: SHENZHEN NEW DEGREE TECHNOLOGY CO., LTD., Guangdong (CN)

(72) Inventor: Hao Li, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 119 days.

(21) Appl. No.: 16/608,586

(22) PCT Filed: May 26, 2017

(86) PCT No.: PCT/CN2017/086041
§ 371 (c)(1),
(2) Date: Oct. 25, 2019

(87) PCT Pub. No.: WO2018/214135
PCT Pub. Date: Nov. 29, 2018

(65) Prior Publication Data
US 2020/0141824 A1 May 7, 2020

(51) Int. Cl.
*G01L 1/22* (2006.01)
*G01L 1/20* (2006.01)

(52) U.S. Cl.
CPC ............ *G01L 1/2287* (2013.01); *G01L 1/205* (2013.01)

(58) Field of Classification Search
CPC .............................. G01L 1/2287; G01L 1/205
See application file for complete search history.

(56) References Cited

U.S. PATENT DOCUMENTS

| 5,406,852 A * | 4/1995 | Hiraka ...................... C03C 8/08 |
| | | 73/721 |
| 2008/0211695 A1* | 9/2008 | Dell'Orto ............. G06F 3/0233 |
| | | 341/20 |

(Continued)

FOREIGN PATENT DOCUMENTS

| CN | 101943618 | 1/2011 |
| CN | 105224129 | 1/2016 |

(Continued)

OTHER PUBLICATIONS

International Search Report for PCT/CN2017/086041 dated Feb. 28, 2018, 6 pages.

(Continued)

*Primary Examiner* — Max H Noori
(74) *Attorney, Agent, or Firm* — Nixon & Vanderhye, P.C.

(57) ABSTRACT

A key unit and a key array, the key unit includes a pressing panel, a key unit sensor assembly and a double-sided adhesive tape connected between the key unit sensor assembly and the pressing panel; the key unit sensor assembly includes a substrate, a first group of sensors and a second group of sensors; the first group of sensors are distributed at a central zone of the substrate, the central zone is corresponding to a key center on the pressing panel; two groups of sensors are arranged on the substrate, the first group of sensors are distributed at the central zone of the substrate, the second group of sensors are distributed at a zone of the substrate adjacent to an edge, the first group of sensors and the second group of sensors are used to detect different pressure values of the zone.

16 Claims, 4 Drawing Sheets

(56) References Cited

U.S. PATENT DOCUMENTS

| | | | |
|---|---|---|---|
| 2008/0290648 A1* | 11/2008 | Koops | C09J 7/38 |
| | | | 283/81 |
| 2016/0188103 A1 | 6/2016 | Bernstein et al. | |
| 2017/0052263 A1* | 2/2017 | Jadrich | G01T 1/2018 |

FOREIGN PATENT DOCUMENTS

| | | |
|---|---|---|
| CN | 205644492 | 10/2016 |
| CN | 106201063 | 12/2016 |

OTHER PUBLICATIONS

Written Opinion of the ISA for PCT/CN2017/086041 dated Feb. 28, 2018, 4 pages.

* cited by examiner

KEY UNIT AND KEY ARRAY

CROSS-REFERENCE TO RELATED APPLICATIONS

This application is the U.S. national phase of International Application No. PCT/CN2017/086041 filed May 26, 2017 which designated the U.S., the entire contents of which is hereby incorporated by reference.

TECHNICAL FIELD

The present disclosure relates to the technical field of keys, and more particularly to a key unit and a key array.

BACKGROUND

Most keys in the prior art are pressure keys, and the working principle of the pressure keys is as follows: after a pressure key is pressed on a panel, a pressure sensor arranged at the center of the panel detects a change of pressure applied on the panel to activate the key. The pressure key in the prior art has a problem that when a pressing position is deviated from the center of the key, it is caused that a pressure range of the key cannot be determined, a magnitude of the pressing force cannot be accurately judged, and the pressing position cannot be determined, although a greater force is used for pressing, which may also function as activating the key.

Technical Problem

The present disclosure provides a key unit and a key array, which solves a problem in the prior art that the magnitude of the pressing force and the pressing position cannot be accurately determined because the pressuring position is deviated from the key center.

TECHNICAL SOLUTION

In one aspect, the present disclosure provides a key unit, including a pressing panel, a key unit sensor assembly and a double-sided adhesive tape connected between the key unit sensor assembly and the pressing panel;

the key unit sensor assembly includes a substrate, a first group of sensors and a second group of sensors;

where the first group of sensors are distributed at a central zone of the substrate, and the central zone is corresponding to a key center on the pressing panel;

the second group of sensors are distributed at a zone of the substrate beyond the central zone; and the first group of sensors and the second group of sensors are configured to detect pressure on the substrate.

In combination with the first aspect, as a first implementation mode of the present disclosure, the central zone is in a regular shape including a square shape, a rhomobus shape, a circular shape and an oval shape or in an irregular shape, which takes the center of the substrate as the center.

In combination with the first implementation mode of the first aspect, as a second implementation mode of the first aspect, the central zone is a circular zone which takes the center of the substrate as the center thereof and takes a first preset distance as the radius thereof.

In combination with the second implementation mode of the first aspect, as a third implementation mode of the first aspect, the first group of sensors is distributed along an arc of the circular zone; or alternatively, part of sensors in the first group of sensors are distributed along the arc, and the other part of sensors in the first group of sensors are distributed at the circular zone.

In combination with the second implementation mode of the first aspect, as a fourth implementation mode of the first aspect, the second group of sensors are distributed along an arc which takes the center of the substrate as the center thereof, and takes a second preset distance as the radius thereof, where the second preset distance is greater than the first preset distance.

In combination with the first implementation mode, the second implementation mode, the third implementation mode and the fourth implementation mode of the first aspect, as a fifth implementation mode of the first aspect, the first group of sensors and the second group of sensors are at least two pairs of resistors distributed at a front surface and a rear surface of the substrate respectively, and the resistors are configured to output sensing signals by changing resistance values thereof when the surface of the substrate is subjected to a tensile deformation or a compressive deformation.

In combination with the fifth implementation mode of the first aspect, as a sixth implementation mode of the first aspect, the first group of sensors includes a first resistor, a second resistor, a third resistor and a fourth resistor, where the first resistor and the second resistor are arranged on the front surface of the substrate, the third resistor and the fourth resistor are arranged on the rear surface of the substrate, the first resistor and the third resistor are oppositely arranged, and the second resistor and the fourth resistor are oppositely arranged.

In combination with the sixth implementation mode of the first aspect, as a seventh implementation mode of the first aspect, a first end of the first resistor and a first end of the second resistor are connected in common with a supply voltage, a second end of the first resistor is connected with a first end of the third resistor so as to form a first output of the first group of sensors; a second end of the second resistor is connected with a first end of the fourth resistor so as to form a second output of the first group of sensors; and both a second end of the third resistor and a second end of the fourth resistor are grounded.

In combination with the fifth implementation mode of the first aspect, as an eighth implementation mode of the first aspect, the second group of sensors includes a fifth resistor, a sixth resistor, a seventh resistor and an eighth resistor; the fifth resistor and the sixth resistor are arranged on the front surface of the substrate, the seventh resistor and the eighth resistor are arranged on the rear surface of the substrate, the fifth resistor and the seventh resistor are oppositely arranged, and the sixth resistor and the eighth resistor are oppositely arranged.

In combination with the eighth implementation mode of the first aspect, as ninth implementation mode of the first aspect, a first end of the fifth resistor and a first end of the seventh resistor are connected in common with a supply voltage, a second end of the fifth resistor is connected with a first end of the sixth resistor so as to form a first output of the second group of sensors; a second end of the sixth resistor is connected with a first end of the eighth resistor so as to form a second output of the second group of sensors; both a second end of the sixth resistor and a second end of the eighth resistor are grounded.

In a second aspect, the present disclosure provides a key array, including a key unit provided by the first embodiment mode, the second embodiment mode, the third embodiment mode, the fourth embodiment mode, the fifth embodiment mode, the sixth embodiment mode, the seventh embodiment mode, the eighth embodiment mode in the first aspect, where multiple key units or a key array is formed on the pressing panel according to arrangement and combination of a plurality of key units.

Advantageous Effects of the Present Disclosure

The present disclosure provides a key unit and a key array, two groups of sensors are arranged on the substrate, where the first group of sensors are distributed at the central zone of the substrate, and the second group of sensors are distributed at a zone of the substrate adjacent to the edge, pressure values of different zones are detected respectively according to the first group of sensors and the second group of sensors, so that an accurate determination of the magnitude and the position of the pressure applied on the substrate is achieved.

BRIEF DESCRIPTION OF THE DRAWINGS

In order to explain the embodiments of the present disclosure more clearly, a brief introduction regarding the accompanying drawings that need to be used for describing the embodiments of the present disclosure or the related art is given below; it is obvious that the accompanying drawings described as follows are merely some embodiments of the present disclosure, for the person of ordinary skill in the art, other drawings may also be acquired according to the current drawings on the premise of without paying creative labor.

DESCRIPTION OF THIS EMBODIMENTS

In order to make the objective, the technical solution and the advantages of the present disclosure be clearer and more understandable, the present disclosure is further described in detail below with reference to accompanying figures and embodiments hereinafter. It should be understood that the specific embodiments described herein are only intended to illustrate but not to limit the present disclosure.

Figure 1:
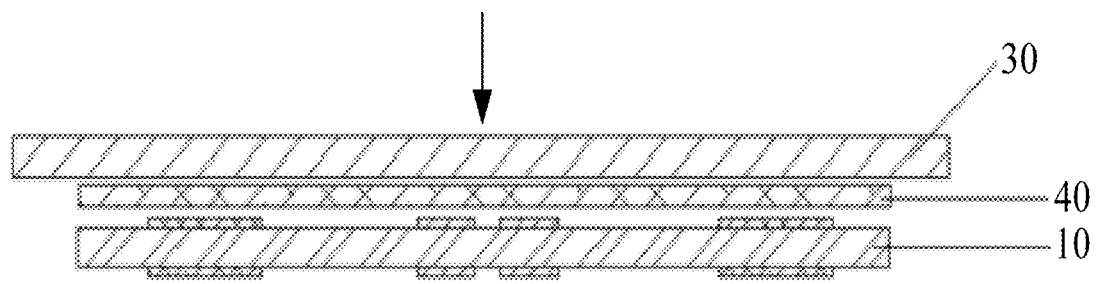
FIG. 1 depicts a cross-sectional structural diagram of a key unit provided by one embodiment of the present disclosure.

Embodiment one of the present disclosure provides a key unit, as shown in FIG. 1, the key unit includes a pressing panel 30, a key unit sensor assembly and a double-sided adhesive tape 40 configured to be connected with the key unit sensor assembly and the pressing panel 30, the pressing panel 30 is configured to be subjected to external pressure and transmit the external pressure to the key unit sensor assembly. The key unit sensor assembly includes a substrate 10, a first group of sensors and a second group of sensors.

After the pressing panel 30 is subjected to the external pressure, the surface of the panel generates a bending deformation; the panel causes the double-sided tape and the key unit sensor assembly to generate deformations with the same curvature. At the moment, the central line of the substrate of the key unit sensor assembly is taken as a bending center line, a rear surface of the substrate generates a tensile deformation, and a front surface of the substrate generates a compressive deformation. The magnitude of pressure change and the direction of the pressure are detected by the sensors arranged at different positions of the substrate, so that the magnitude of the applied pressure is acquired.

The first group of sensors is distributed at the central zone of the substrate 10 that corresponds to the key center on the pressing panel 30.

The second group of sensors is distributed at a zone of the substrate 10 that is beyond the central zone.

The first group of sensors and the second group of sensors are configured to detect the pressure on the substrate 10, in particular, both the first group of sensors and the second group of sensors are configured to detect the pressure which is transmitted by the pressing panel 30 to the substrate 10 through the double-sided adhesive tape 40.

In this embodiment of the present disclosure, the central zone has a regular shape such as a square shape, a rhombus shape, a round shape or an oval shape, or has other irregular shapes which take the center of the substrate 10 as the center.

In one embodiment, the central zone is a circular zone which takes the center of the substrate 10 as the center thereof and takes a first preset distance as the radius thereof.

Figure 2:
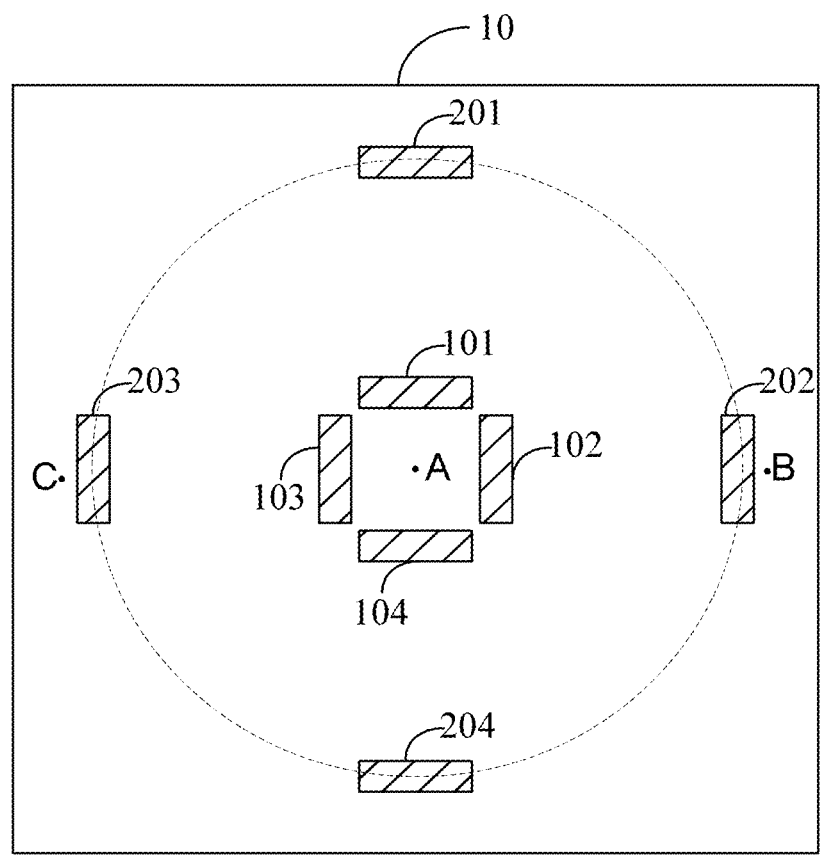
FIG. 2 depicts a schematic structural diagram of a key unit provided by one embodiment of the present disclosure.
Figure 3:
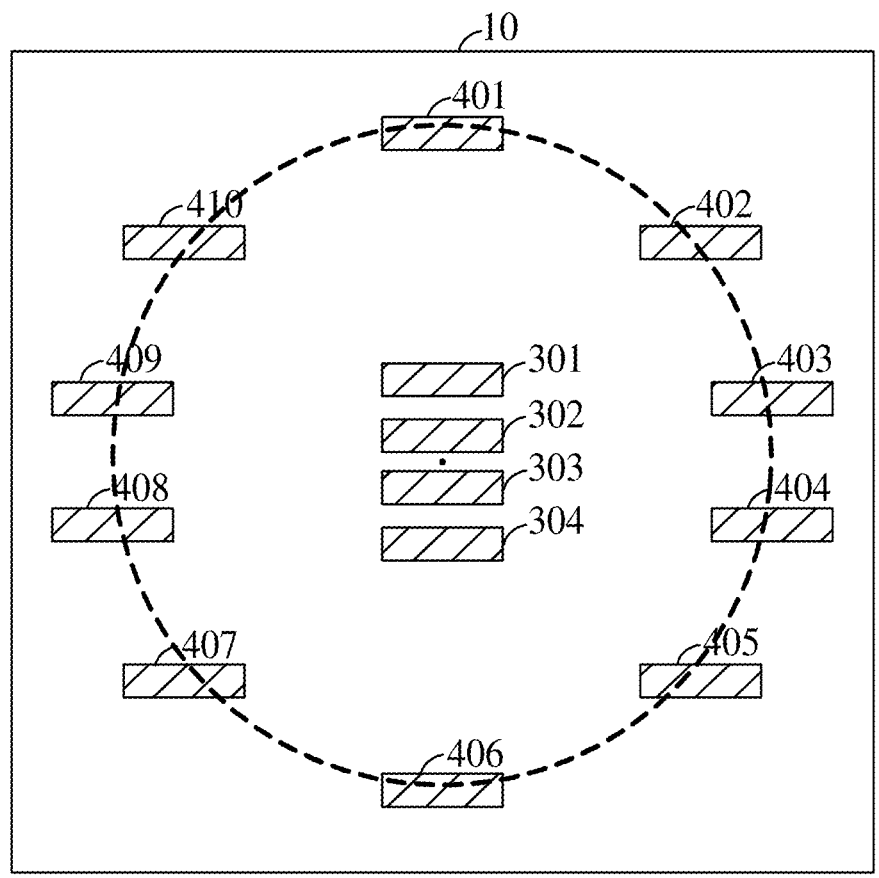
FIG. 3 depicts a schematic structural diagram of a key unit provided by another embodiment of the present disclosure.

As shown in FIG. 2, the sensor 101, the sensor 102, the sensor 103 and the sensor 104 in the first group of sensors are distributed along the arc of the circular zone; or alternatively, as shown in FIG. 2, part of sensors 301 and 304 in the first group of sensors are distributed along the arc, and the other part of sensors 302 and 303 are distributed at the circular zone.

In this embodiment of the present disclosure, the zone of the substrate 10 adjacent to the edge may be a zone acquired by extending inwards by a preset distance by taking each edge of the substrate 10 as a reference, and may also be a zone formed by an edge of a pattern which is formed by taking the center of the substrate 10 as the center and the edge of the substrate 10.

In one embodiment, the second group of sensors is distributed along the arc which takes the center of the substrate 10 as the center thereof, and takes the second preset distance as the radius thereof, where the second preset distance is greater than the first preset distance.

Figure 4:
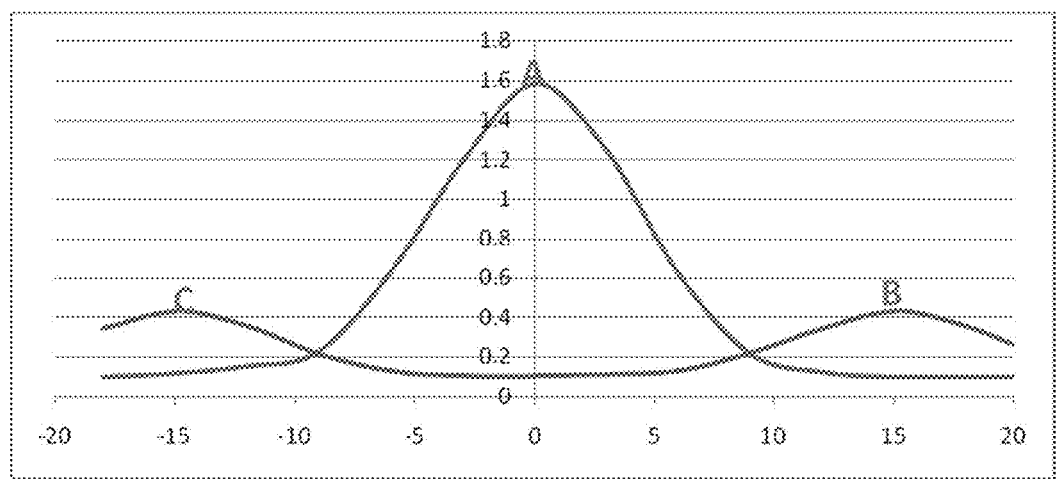
FIG. 4 depicts a schematic diagram of a pressure curve of a key unit provided by one embodiment of the present disclosure.

The working principle of the embodiment of the present disclosure is illustrated by taking FIG. 1 as the example. As shown in FIG. 4, assuming that the pressing point is located at the center point A of a module, and a signal distribution from point C to point A and from point A to point B is shown in FIG. 4:

It can be seen that when the point C is pressed, the sensor 203 in the second group of sensors has certain amount of signals; at this moment, there are very weak sensing signals in the first group of sensors.

When the point A is pressed, there is a maximum signal amount of sensing signals in the first group of sensors, meanwhile, there are very weak sensing signals in the second group of sensors.

When the point B is pressed, the second group of sensors has certain sensing signals, meanwhile, there are very weak sensing signals in the first group of sensors.

In this way, by identifying the magnitudes of the sensing signals in the first group of sensors and the second group of sensors, and the ratio of the magnitude of sensing signals in the first group of sensors to the magnitude of sensing signals in the second group of sensors, such that the position of the pressing point and the magnitude of the applied pressing force are determined.

A judgment condition and a key range of the key are as follows:

Signal 1>setting value X;

X1>signal1/signal2>X2; where, signal 1 is a signal as output by the first group of sensors when the panel is pressed; and signal 2 is a signal as output by the second group of sensors when the panel is pressed;

where, X is defined as a predetermined threshold value of a certain signal, X1 and X2 are defined as certain designed parameters, when the center of the first group of sensors is taken as the center of the bug key, X1 and X2 range from 1 to 5 and are determined by such as the length and the width of the product panel attached in the module and the material and the thickness of the panel, the key range is determined by adjusting X1 and X2, in this situation, it is possible to limit the trigger pressure pressed on the key center of the panel and the key range of the key that can be pressed.

In this embodiment of the present disclosure, two groups of sensors are arranged on the substrate, where the first group of sensors are distributed at the central zone of the substrate, and the second group of sensors are distributed at the zone of the substrate adjacent to the edge, pressure values of different zones are detected according to the first group of sensors and the second group of sensors respectively, so that the magnitude and the position of the pressure applied on the substrate can be accurately determined.

Further, as another embodiment of the present disclosure, as shown in FIG. 4, the first group of sensors and the second group of sensors are at least two pairs of resistors distributed at the front surface and the rear surface of the substrate 10 respectively, the resistors is configured to output sensing signals through changing resistance values thereof when the front surface of the substrate 10 is subjected to a tensile deformation or a compressive deformation.

Particularly, the resistor arranged on the front surface of the substrate 10 is in a state that the resistance value is decreased, the resistor arranged on the rear surface of the substrate 10 is in a state that the resistance value is increased, according to changes of resistance values of the at least two pairs of resistors on the front surface and the rear surface of the substrate 10, the sensing signals may be output according to the compressive deformation on the front surface of the substrate 10.

In one embodiment, the first group of sensors includes a first resistor R1, a second resistor R2, a third resistor R3 and a fourth resistor R4, the first resistor R1 and the second resistor R2 are arranged on the front surface of the substrate 10, the third resistor R3 and the fourth resistor R4 are arranged on the rear surface of the substrate 10, the first resistor R1 and the third resistor R3 are oppositely arranged, and the second resistor R2 and the fourth resistor R4 are oppositely arranged.

Figure 5:
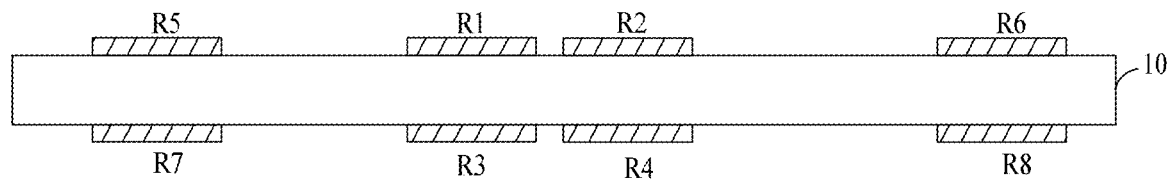
FIG. 5 depicts a schematic structural diagram of a key unit provided by one another embodiment of the present disclosure.

In this embodiment, particularly, as shown in FIG. 5, a first end of the first resistor R1 and a first end of the second resistor R2 are connected in common to a supply voltage, a second end of the first resistor R1 is connected with a first end of the third resistor R3 so as to form a first output of the first group of sensors; a second end of the second resistor R2 is connected with a first end of the fourth resistor R4 so as to form a second output of the first group of sensors, both a second end of the third resistor R3 and a second end of the fourth resistor R4 are grounded.

Where, the second group of sensors include a fifth resistor R5, a sixth resistor R6, a seventh resistor R7 and an eighth resistor R8, the fifth resistor R5 and the sixth resistor R6 are arranged on the front surface of the substrate 10, the seventh resistor R7 and the eighth resistor R8 are arranged on the rear surface of the substrate 10, the fifth resistor R5 and the seventh resistor R7 are oppositely arranged, and the sixth resistor R6 and the eighth resistor R8 are oppositely arranged.

Figure 6:
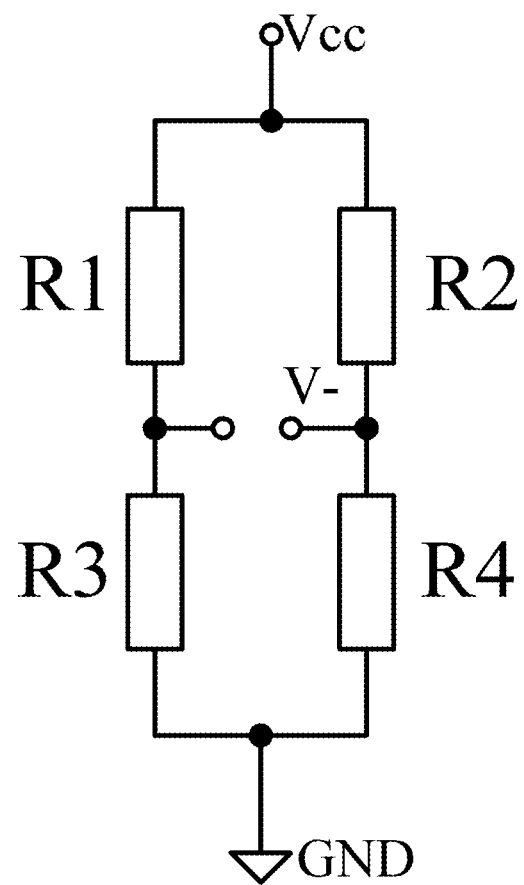
FIG. 6 depicts a circuit diagram of a first group of sensors in the embodiment provided by FIG. 5.
Figure 7:
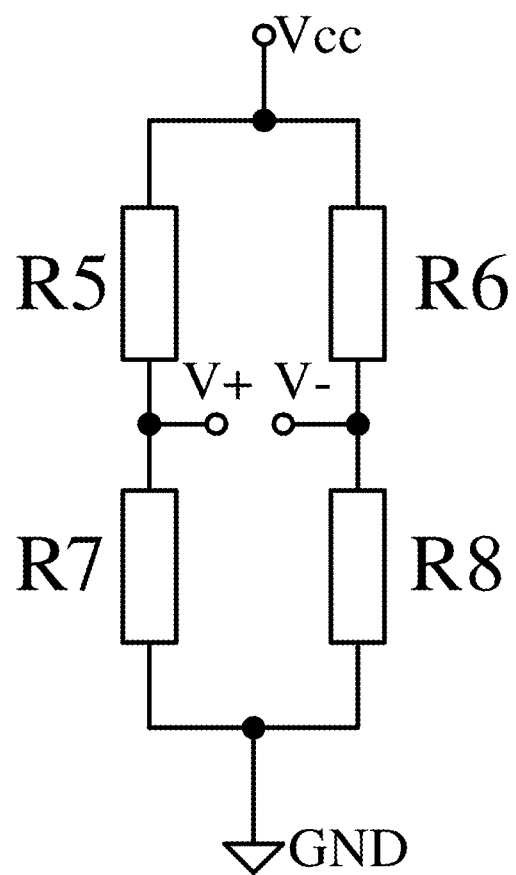
FIG. 7 depicts a circuit diagram of a second group of sensors in the embodiment provided by FIG. 5.

Regarding the second group of sensors, particularly, as shown in FIG. 6, a first end of the fifth resistor R5 and a first end of the seventh resistor R7 are connected to the supply voltage, a second end of the fifth resistor R5 is connected with a first end of the sixth resistor R6 so as to form a first output of the second group of sensors; a second end of the sixth resistor R6 is connected with a first end of the eighth resistor R8 so as to form a second output of the second group of sensors, both the second end of the sixth resistor R6 and a second end of the eighth resistor R8 are grounded.

The working principle of the embodiment mentioned above is described as follows: the first group of sensors include a first resistor R1, a second resistor R2, a third resistor R3 and a fourth resistor R4, the second group of sensors include a fifth resistor R5, a sixth resistor R6, a seventh resistor R7 and an eighth resistor R8, in the arrangement of the pressing panel, the first resistor R1, the second resistor R2, the third resistor R3 and the fourth resistor R4 are located at the center of the pressing panel, and may be in such as a sequence arrangement or a circular arrangement, the fifth resistor R5, the sixth resistor R6, the seventh resistor R7 and the eighth resistor R8 are located at an edge position of the pressing panel, and the fifth resistor R5, the sixth resistor R6, the seventh resistor R7 and the eighth resistor R8 have the same distances away from the center point; the distances of the fifth resistor R5, the sixth resistor R6, the seventh resistor R7 and the eighth resistor R8 away from the center point may be finely adjusted respectively according to the size of the pressing panel (e.g., a square pressing panel or a rectangular pressing panel), that is, the fifth resistor R5, the sixth resistor R6, the seventh resistor R7 and the eighth resistor R8 may be in an oval distribution, a rhombic distribution or other distribution.

The first resistor R1, the second resistor R2, the fifth resistor R5 and the sixth resistor R6 function as detecting stretching of the front surface of the pressing panel respectively, when the substrate 10 is pressed, the four resistors are in a decreased state after the substrate 10 is pressed; the third resistor R3, the fourth resistor R4, the seventh resistor R7 and the eighth resistor R8 are arranged to be opposite to the first resistor R1, the second resistor R2, the fifth resistor R5 and the sixth resistor R6 respectively, and are configured to detect the compressive deformation of the rear surface of the pressing panel, these four resistors are in an increased state after the substrate 10 is pressed; this arrangement facilitates an improvement of the signal quantity of the two groups of sensors of the pressing panel and an improvement of the sensitivity.

In this embodiment, differential output of the sensing signals is performed through four resistors, so that the noise loaded on the resistor by the external and the temperature drift caused by the change of the external environment may be effectively reduced; due to the fact that electromagnetic noise, mechanical vibration, temperature drift or other noises in the external may be loaded on each of the resistors, these common quantities are reduced after a calculus of difference is performed by the resistors, so that noise and temperature drift may be suppressed.

Furthermore, as another embodiment, as shown in FIG. 1, this device may only use the first group of sensors, part of sensors 101, 102, 103, 104 in the first group of sensors are distributed at the central zone of the substrate 10, and the other part of sensors 201, 202, 203, 204 are distributed at the zone of the substrate adjacent to the edge, where the sensor 101 and the sensor 102 form the first resistor R1, the sensor 103 and the sensor 104 form the second resistor R2; the sensor 201 and the sensor 202 form the third resistor R3, and the sensor 203 and the sensor 204 form the fourth resistor R4; the first end of the first resistor R1 and the first end of the second resistor R2 are connected in common with the supply voltage, the second end of the first resistor R1 is connected with the first end of the third resistor R3 so as to form the first output of the first group of sensors, the second end of the second resistor R2 is connected with the first end of the fourth resistor R4 so as to form a second output of the first group of sensors, both the second end of the third resistor R3 and the second end of the fourth resistor R4 are grounded. In this case, a set of signals are merely output by the whole key unit;

In this case, the judgment condition of the key range is updated as:

signal 1>setting value X;

The signal 1 is a signal output by the first group of sensors when the panel is pressed;

X is defined as a predetermined threshold value of certain signal, and the signal 1 will have the maximum value when the predetermined bug key center of the panel corresponding to the center of the first group of sensors is pressed; the signal 1 gradually decreases and may drop below zero point and reach a negative value when the pressing position gradually moves from the center position to the edge; the maximum point of the negative value is located at a certain position corresponding to the first group of sensors 201, 202, 203 and 204.

The control of the key range is achieved by limiting the threshold value X. Moreover, the trigger pressure of the key may be limited to a certain extent.

It should be noted that the manufacturing of the sensors may be implemented by a printing method, and may also be implemented by etching, photoetching or other methods, and may also be implemented by a method of attaching an independent pressure measurement sensor.

Figure 8:
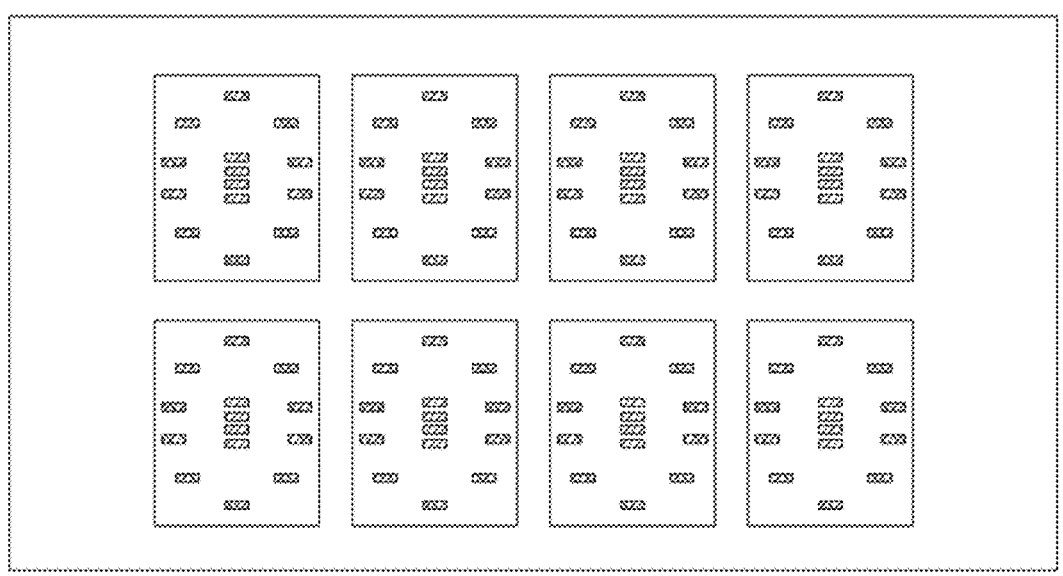
FIG. 8 depicts a schematic structural diagram of a key array provided by another embodiment of the present disclosure.

As another embodiment of the present disclosure, the present disclosure further provides a key array, as shown in FIG. 8, the key array includes the aforesaid key unit, and multiple key units or key combination are formed on the pressing panel according to arrangement and combination of a plurality of key units.

What described above are the further detailed explanations of the present disclosure in combination with the specific preferable embodiments, however, the specific implementations of the present disclosure shouldn't be regarded as being merely restricted by these explanations. For the person of ordinary skill in the technical field of the present disclosure, some equivalent replacements or significant modifications which are made without breaking away from the concept of the present disclosure and have the same performance or purpose, should all be included in the patent protection scope of the present disclosure determined by the submitted claims.

What is claimed is:

1. A key unit, comprising a pressing panel, a key unit sensor assembly and a double-sided adhesive tape connecting the key unit sensor assembly with the pressing panel;
   the key unit sensor assembly comprising a substrate, a first group of sensors and a second group of sensors;
   wherein the first group of sensors are distributed at a central zone of the substrate, the central zone corresponding to a key center on the pressing panel;
   the second group of sensors are distributed at a zone of the substrate other than the central zone; and
   the first group of sensors and the second group of sensors are configured to detect pressure transmitted by the pressing panel to the substrate through the double-sided adhesive tape,
   wherein the first group of sensors and the second group of sensors comprise at least two pairs of resistors distributed at a front surface and a rear surface of the substrate respectively, and the resistors are configured to output sensing signals by changing resistance values thereof when the substrate is subjected to a tensile deformation or a compressive deformation.

2. The key unit according to claim 1, wherein the central zone is in a regular or irregular shape taking a center of the substrate as its center.

3. The key unit according to claim 2, wherein the central zone is a circle zone taking the center of the substrate as its center and takes a first preset distance as its radius.

4. The key unit according to claim 3, wherein the first group of sensors is distributed along an arc of the circle zone.

5. The key unit according to claim 3, wherein the second group of sensors are distributed along an arc, the arc taking the center of the substrate as a center, and taking a second preset distance as a radius, wherein the second preset distance is greater than the first preset distance.

6. The key unit according to claim 3, wherein some of the first group of sensors are distributed along an arc, and the other sensors of the first group of sensors are distributed along the circle zone.

7. The key unit according to claim 1, wherein the first group of sensors comprises a first resistor, a second resistor, a third resistor and a fourth resistor, the first resistor and the second resistor being arranged on the front surface of the substrate, the third resistor and the fourth resistor being arranged on the rear surface of the substrate, the first resistor and the third resistor being oppositely arranged, and the second resistor and the fourth resistor being oppositely arranged.

8. The key unit according to claim 7, wherein a first end of the first resistor and a first end of the second resistor are connected with a supply voltage, a second end of the first resistor is connected with a first end of the third resistor so as to form a first output of the first group of sensors; a second end of the second resistor is connected with a first end of the fourth resistor so as to form a second output of the first group of sensors; and both a second end of the third resistor and a second end of the fourth resistor are grounded.

9. The key unit according to claim 1, wherein the second group of sensors comprises a fifth resistor, a sixth resistor, a seventh resistor and an eighth resistor; the fifth resistor and the sixth resistor being arranged on the front surface of the substrate, the seventh resistor and the eighth resistor being arranged on the rear surface of the substrate, the fifth resistor and the seventh resistor being oppositely arranged, and the sixth resistor and the eighth resistor being oppositely arranged.

10. The key unit according to claim 9, wherein a first end of the fifth resistor and a first end of the seventh resistor are connected with a supply voltage, a second end of the fifth resistor is connected with a first end of the sixth resistor so as to form a first output of the second group of sensors; a second end of the sixth resistor is connected with a first end of the eighth resistor so as to form a second output of the second group of sensors; both a second end of the sixth resistor and a second end of the eighth resistor are grounded.

11. A key array arranged on a common pressing panel, the key array comprising:
    a plurality of key units each comprising a key unit sensor assembly and a double-sided adhesive tape connecting the key unit sensor assembly with the common pressing panel;
    the key unit sensor assembly comprising a substrate, a first group of sensors and a second group of sensors;
    wherein the first group of sensors are distributed at a central zone of the substrate, the central zone corresponding to a respective key center on the common pressing panel;
    the second group of sensors are distributed at a zone of the substrate other than the central zone; and
    the first group of sensors and the second group of sensors are configured to detect pressure transmitted by the common pressing panel to the substrate through the double-sided adhesive tape,
    wherein the first group of sensors and the second group of sensors comprise at least two pairs of resistors distributed at a front surface and a rear surface of the substrate respectively, and the resistors are configured to output sensing signals by changing resistance values thereof when the substrate is subjected to a tensile deformation or a compressive deformation.

12. A control panel comprising:
    a pressing panel,
    plural key sensor assemblies, and
    double-sided adhesive tape connecting the plural key sensor assemblies with the pressing panel;
    each key sensor assembly comprising a substrate, a first plurality of resistors disposed at a central zone of the substrate and a second plurality of resistors disposed on the substrate other than at the central zone;
    wherein the position of first plurality of resistors relative to the pressing panel defines a key center on the pressing panel; and
    a measuring circuit connected to the first and second plurality of resistors, the measuring circuit having measuring parameters that define the range of a key on the pressing panel relative to the key center,
    wherein the first plurality of resistors and the second plurality of resistors each comprise at least two pairs of resistors distributed on different surfaces of the substrate respectively, and the resistors are configured to output sensing signals by changing resistance values thereof when the substrate is subjected to a tensile deformation or a compressive deformation.

13. The control panel according to claim 12, wherein the central zone is in a regular or irregular shape taking a center of the substrate as its center.

14. The control panel according to claim 13, wherein the central zone is circular takes a first preset distance as its radius.

15. The control panel according to claim 14, wherein the first plurality of resistors is distributed along an arc of the circular central zone.

16. The control panel according to claim 14, wherein the second plurality of resistors are distributed along an arc, the arc taking the center of the substrate as a center, and taking a second preset distance as a radius, wherein the second preset distance is greater than the first preset distance.

* * * * *